United States Patent
Belur

(10) Patent No.: US 11,960,708 B2
(45) Date of Patent: Apr. 16, 2024

(54) METHOD AND APPARATUS FOR GEOTAGGING COMPONENTS OF AN ENERGY PRODUCTION AND CONSUMPTION SYSTEM

(71) Applicant: Enphase Energy, Inc., Petaluma, CA (US)

(72) Inventor: Raghuveer R. Belur, Los Altos Hills, CA (US)

(73) Assignee: Enphase Energy, Inc., Petaluma, CA (US)

( * ) Notice: Subject to any disclaimer, the term of this patent is extended or adjusted under 35 U.S.C. 154(b) by 200 days.

(21) Appl. No.: 17/532,071

(22) Filed: Nov. 22, 2021

(65) Prior Publication Data
US 2022/0171509 A1    Jun. 2, 2022

Related U.S. Application Data

(60) Provisional application No. 63/119,985, filed on Dec. 1, 2020.

(51) Int. Cl.
| | |
|---|---|
| G06F 3/0484 | (2022.01) |
| G06F 3/04815 | (2022.01) |
| G06K 7/10 | (2006.01) |
| G06K 7/14 | (2006.01) |
| G06Q 50/06 | (2012.01) |
| G06T 17/05 | (2011.01) |

(52) U.S. Cl.
CPC ........ *G06F 3/0484* (2013.01); *G06F 3/04815* (2013.01); *G06K 7/10366* (2013.01); *G06K 7/1413* (2013.01); *G06K 7/1417* (2013.01); *G06Q 50/06* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 10,540,530 B2 | 1/2020 | Yoscovich et al. | |
| 2016/0084889 A1 | 3/2016 | Mezic et al. | |
| 2016/0161964 A1 | 6/2016 | Sato et al. | |
| 2016/0364646 A1* | 12/2016 | Fischer | B60L 53/52 |
| 2019/0044826 A1 | 2/2019 | Flores | |
| 2020/0120170 A1* | 4/2020 | Amitay | G06F 16/29 |

FOREIGN PATENT DOCUMENTS

KR    10-2177157 B1    11/2020

OTHER PUBLICATIONS

International Search Report and Written Opinion for application No. PCT/US2021/061059, dated Mar. 23, 2022.

* cited by examiner

*Primary Examiner* — Mohammad Ali
*Assistant Examiner* — Saad M Kabir
(74) *Attorney, Agent, or Firm* — MOSER TABOA

(57) ABSTRACT

A method and apparatus for geotagging components of an energy production and consumption system. A user device captures an identifier of at least one component of an energy production and consumption system, determines location data related to the identifier, where the identifier and location data form geotagging data, and transmits the geotagging data to a network. Upon receiving the geotagging data from the network, a server processes the identifier to determine component information and generates a map comprising an icon for each component positioned within the map at a location derived from the geotagging data.

18 Claims, 4 Drawing Sheets

METHOD AND APPARATUS FOR GEOTAGGING COMPONENTS OF AN ENERGY PRODUCTION AND CONSUMPTION SYSTEM

RELATED APPLICATION

This application claims benefit to U.S. Provisional Patent Application Ser. No. 63/119,985 filed 1 Dec. 2020 entitled "Method and Apparatus for Geotagging Components of an Energy Production and Consumption System," which is hereby incorporated herein by reference in its entirety.

BACKGROUND

Field

Embodiments of the present invention generally relate to energy production and consumption systems and, in particular, to a method and apparatus for geotagging components of such systems to produce a holistic system map.

Description of the Related Art

A solar energy generation and storage system typically comprises a number of components including, but not limited to, a plurality of solar panels, one or more power inverters, a storage element and a service panel. The solar panels are arranged in an array and positioned to maximize solar exposure. Each solar panel or small groups of panels may be coupled to an inverter (so-called micro-inverters) or all the solar panels may be coupled to a single inverter. The inverter(s) convert the DC power produced by the solar panels into AC power. The AC power is coupled to the service panel for use by a facility (e.g., home or business), supplied to the power grid, and/or coupled to a storage element such that energy produced at one time is stored for use at a later time. Storage elements may be one or more of batteries, fly wheels, hot fluid tank, hydrogen storage or the like. The most common storage element is a battery pack (i.e., a plurality of battery cells) having a bidirectional inverter coupled to the service panel to supply the batteries with DC power as well as allow the batteries to discharge through the inverter to supply AC power to the facility when needed.

A number of components within the facility to which the generation and storage system is connected consume the generated power, e.g., load or consumption components. Currently, to specify the capacity of a generation and storage system, a purchaser may refer to their current electricity invoices and estimate their average power consumption. Then select a system that approximately matches their current consumption. There currently is no consideration for the actual loads and where those loads are positioned within a facility. Without an understanding of the nature of the entire production and consumption system, it is very difficult to manage the system to optimize energy production and consumption.

Therefore, there is a need for a method and apparatus for geotagging all components of an energy production and consumption system to produce a holistic, three-dimensional view or map of such a system.

BRIEF DESCRIPTION OF THE DRAWINGS

So that the manner in which the above recited features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention comprise apparatus and methods for geotagging components of energy production and consumption systems. In one embodiment, a user device is used to scan component identifiers (e.g., barcode, RFID) to identify system components and simultaneously log a location for the components. The component identification and its location are communicated to a server where the information is used to generate a system map. The map may be a three-dimensional view of all the system components including, but not limited to, solar panels, micro inverters, energy storage, and consumption loads such as electric vehicle chargers, washing machine, air conditioner, hot water heater, etc. In this manner, a holistic view of an energy production and consumption system may be displayed on an electronic device. The display may be interactive (e.g., a graphical user interface), such that, a user may control operation of system components via the map.

Figure 1:
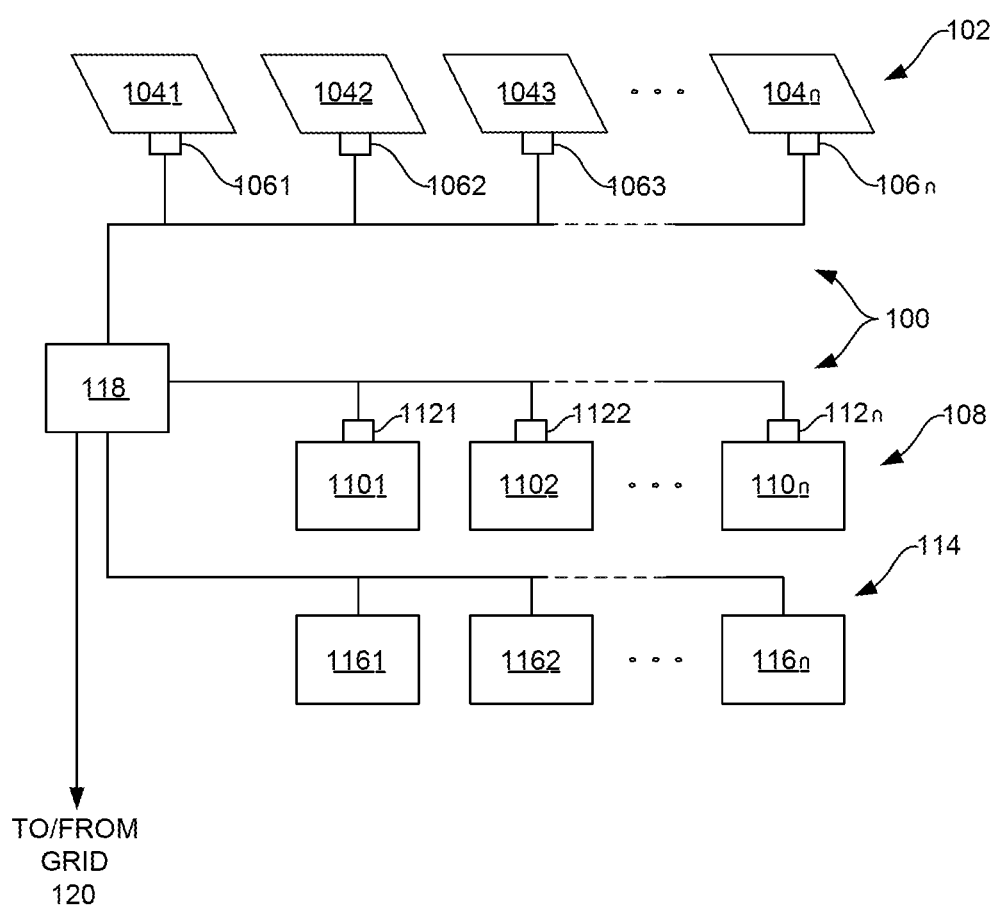
FIG. 1 depicts a block diagram of an energy production and consumption system having components to be geotagged in accordance with at least one embodiment of the invention.

FIG. 1 depicts a block diagram of energy production and consumption system 100 having specific components (e.g., energy generators, energy storage devices, energy consuming appliances, etc.) that are geotagged to create a holistic map of the system 100 in accordance with at least one embodiment of the invention. The system 100 comprises a plurality of distributed generators 102 (e.g., solar panels 104$_1$, 104$_2$, 104$_3$, . . . 104$_n$ coupled to inverters 106$_1$, 106$_2$, 106$_3$, . . . 106$_n$), storage devices 108 (e.g., batteries 110$_1$, 110$_2$, . . . 110$_n$ coupled to bidirectional inverters 112$_1$, 112$_2$, . . . 112$_n$), and a service panel 118 through which the distributed generator 102 is coupled to the storage 108. The service panel 118 is also coupled to a plurality of loads 114 represented by loads 116$_1$, 116$_2$, . . . 116$_n$. The loads 114, in a residential application, may comprise washer, dryer, refrigerator, air conditioner, hot water heater, electric vehicle charger, and/or any other electricity consuming device in the household. The loads 114, in an industrial application, may comprise electric motors, heating systems, air conditioning systems, refrigerators, freezers, and/or any other electricity consuming device generally used in an industrial setting. The service panel 118 may also be coupled to the power grid 120, such that, energy may be consumed from the grid 120 or sourced to the grid 120, as necessary. Alternatively, as is described in detail below, the service panel may include or may be replaced by and energy management device that controls the flow of energy throughout the system 100. As shall be described below, embodiments of the present invention facilitate geotagging components (generators 102, storage devices 108, service panel 118 and loads 114) of the energy production and consumption system 100 and utilizing the geotagging data to generate a holistic map of the system 100.

Although FIG. 1 depicts a distributed generator 102 having a single solar panel coupled to a single inverter (i.e., micro-inverter), this depiction is not meant to limit the scope of the invention. For example, embodiments of the invention may also be used with distributed generators having a plurality or more solar panels coupled to one or more inventers. In other system, the distributed generator may be formed by solar panels that are each coupled to a DC optimizer and the optimizers are coupled to at least one inverter to produce AC power. Furthermore, distributed generators may include other forms of energy generation such as wind turbines arranged on a so-called "wind farm." Similarly, energy storage in a battery-based storage system is described as an example of the type of storage whose capacity is estimated using embodiments of the invention; however, other forms of energy storage may be used such as fly wheel(s), hot fluid tank(s), hydrogen storage system(s), pressurized gas storage system(s), pumped storage hydropower, fuel cells, or the like.

Figure 2:
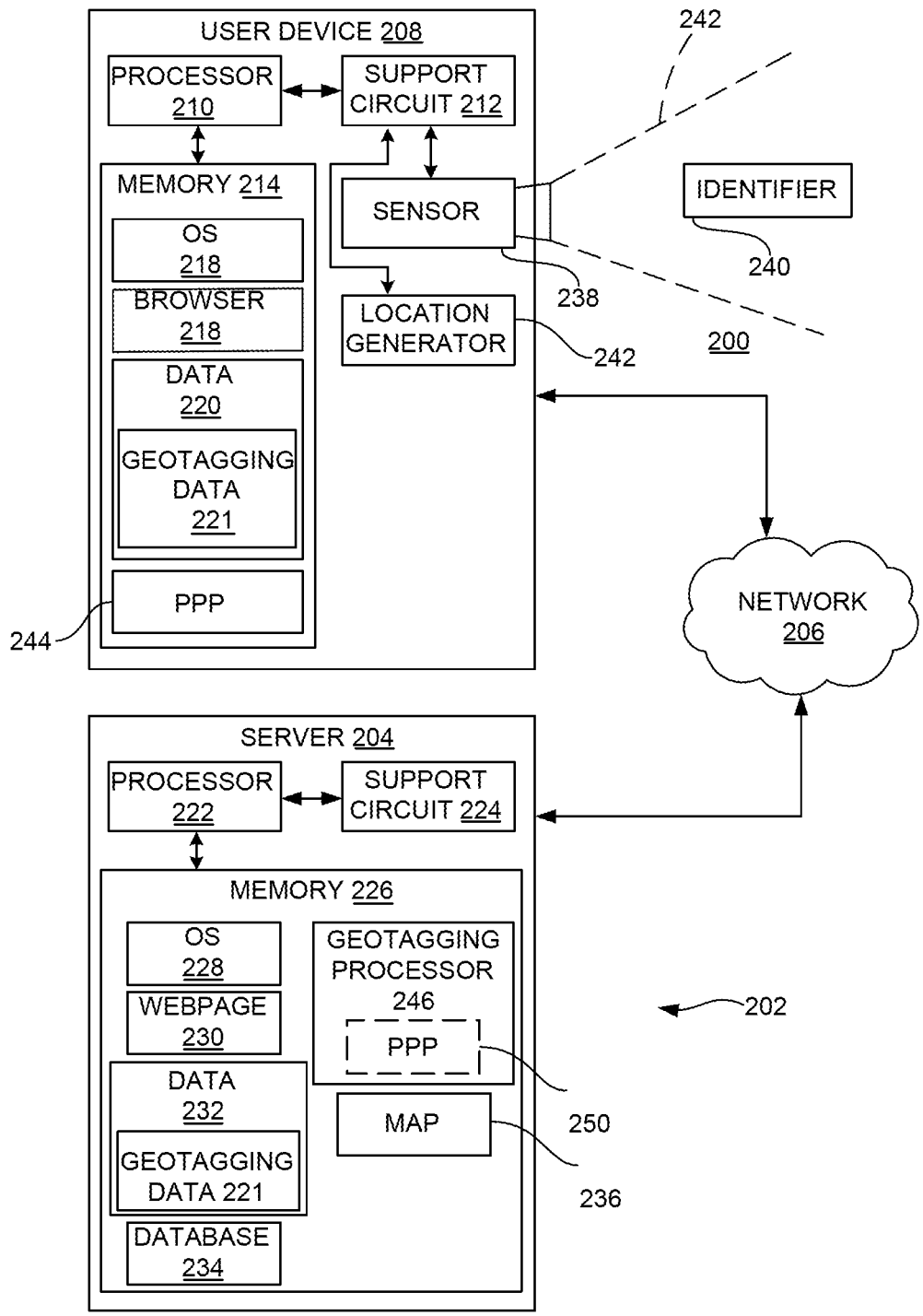
FIG. 2 depicts a block diagram of a system for geotagging the components of the system of FIG. 1 in accordance with an embodiment of the invention.

FIG. 2 depicts a block diagram of a geotagging system 200 for geotagging the components (e.g., 102, 108, 114, 118) of an energy production and consumption system 100 in accordance with an embodiment of the invention. The geotagging system 200 comprises a server 204, a computer network 206 (e.g., WiFi, cellular network, Internet, BLUETOOTH® (e.g., % a technology standard used to enable short-range wireless communication between electronic devices) or combinations thereof) and at least one user device 208 (e.g., mobile phone, digital assistant, computer, or any other device capable producing an accurate location and sensing/capturing a component identifier). In operation, the user device 208 accesses a web page from the server 204 and displays the web page for user interaction, i.e., a user interface. The interface may also be produced through execution of an application on the user device. The server 204, when executing specific software, enables the general-purpose server to operate as a specific-purpose device. Specifically, the server operates as a geotagging processor to determine a holistic map of the energy production and consumption system 100. In some embodiments, the geotagging processing described below may be performed by the user device and a server may not be used.

The user device 208 comprises at least one processor 210, support circuits 212 and memory 214. The at least one processor 210 may be any form of processor or combination of processors including, but not limited to, central processing units, microprocessors, microcontrollers, field programmable gate arrays, graphics processing units, and the like. The support circuits 212 may comprise well-known circuits and devices facilitating functionality of the processor(s). The support circuits 212 may comprise one or more of, or a combination of, power supplies, clock circuits, communications circuits, cache, displays, and/or the like.

The user device 208 further comprises a sensor 238 for capturing a component identifier 240. The sensor 238 may be coupled to various support circuits to buffer, filter and/or digitize sensor data. The component identifier 240 is generally attached to the component and is a unique identifier of the particular component, e.g., identifying a specific model of microinverter, solar panel, storage battery, appliance, etc.

In one embodiment, the sensor 238 is a camera for imaging an identifier 240 such as a barcode, QR Code or serial number. In other embodiments, the sensor 238 is a RFID sensor and the identifier 240 is an RFID tag. In a further embodiment, the component may contain a position location device (e.g., GNSS receiver) and may transmit the component's location to the user device as an RF (radio frequency) transmission (a form of identifier 240) containing the location. Generally, the sensor 238 may be any sensor capable of receiving information from an identifier 240 such that the server 204 can determine from the identifier the identity of the component associated with the identifier.

The user device 208 may also comprises location generator 242 to produce a location of the user device 208 at the time the device is used to capture the identifier 240. The location generator 242 may be a global navigation satellite system (GNSS) receiver that is coupled to the support circuits 212 to buffer location data. The GNSS receiver receives satellite signals to produce location data (latitude, longitude, and elevation) representing the location of the user device 208. For some GNSS receivers, the location data generated by the receiver is not accurate enough to determine specific locations of objects such as the components of the system 100. As such, additional processing of the location data may be necessary to achieve positions accurate to less than 50 cm. The additional processing is described below with respect to precise point positioning (PPP) software 244. Together the component identifier and component location form geotagging data 221.

Alternatively, the location generator 242 may comprise a BLUETOOTH® transceiver whose received signals may be processed using one or more of, but not limited to, High Accuracy Distance Measurements (HADM), angle of arrival (AoA), angle of departure (AoD) techniques to generate locations of components either using the BLUETOOTH® transceiver alone or in combination with location data produced by the GNSS receiver. Accelerometer data from the user device 208 may also be used to enhance position location of either the BLUETOOTH® transceiver, the GNSS receiver, or both.

The memory 214 comprises one or more forms of non-transitory computer readable media including one or more of, or any combination of, read-only memory or random-access memory. The memory 214 stores software and data including, for example, an operating system (OS) 216, a browser 218, data 210 and precise point positioning (PPP) software 244. The operating system 216 may be any form of operating system such as, for example, Apple iOS, Microsoft Windows, Apple macOS, Linux, Android or the like. The browser 218 may be any software that, when executed by the processor(s) 210, is capable of displaying and enabling user interaction with a web page. Such browsers 218 include, but are not limited to, Explorer®, Safari®, Chrome®, Edge®, Firefox® or the like. The data 220 may include a web page, or portion thereof, data used by a web page, data entered by a user into fields within a web page, geotagging data 221, and/or any other data used by the browser 218 to display and facilitate user interaction with a web page. In lieu of a web page interface, the interface may be generated through execution of an application (an app) on the user device without reliance on a connection to the server.

The PPP software 244 uses data from the location generator 242 such as GNSS data including location data, raw received signal data from one or more satellite frequencies, signal phase, differential signal delay, and the like (so-called direct observables) to calculate an accurate position (e.g., on a centimeter scale). To enhance position accuracy further, some PPP techniques utilize additional information to augment the location calculation. Such additional information includes satellite ephemerides from sources other than the satellite signals and/or locally generated reference signals from a transmitter positioned at the site where the components are located. The PPP software 244 may also process BLUETOOTH® data and/or accelerometer data, as mentioned above to enhance or generate accurate component locations. Various known PPP techniques are available to produce locations that are accurate to a few centimeters. The PPP software may be executed on the user device 208 or the server 204. There is no need to perform the PPP processing on the user device 208. The raw data used by the PPP software may be sent to the server 204 for subsequent processing to produce accurate locations associated with the components of the system 100 of FIG. 1.

The user device 208 generates a user interface (UI) to facilitate using the user device to capture the identifier and generate a location of the identifier. Typically, the UI is a web page displayed via a browser 218 or an application executing on the user device 208. After receiving sensor data containing component identifier information and a location (or raw data representing the location) of the identifier (together referred to herein as geotagging data 221), the user device 208 transmits the geotagging data 221 through the network to the server 204.

The server 204 comprises at least one processor 222, support circuits 224 and memory 226. The at least one processor 222 may be any form of processor or combination of processors including, but not limited to, central processing units, microprocessors, microcontrollers, field programmable gate arrays, graphics processing units, and the like. The support circuits 224 may comprise well-known circuits and devices facilitating functionality of the processor(s). The support circuits 224 comprise one or more of, or a combination of, power supplies, clock circuits, communications circuits, cache, and/or the like.

The memory 226 comprises one or more forms of non-transitory computer readable media including one or more of, or any combination of, read-only memory or random-access memory. The memory 226 stores software and data including, for example, an operating system (OS) 228, a web page 230, data 232, a component database 234, geotagging processor software 246, and a component map 236. The operating system 228 may be any form of operating system such as, for example, Apple iOS, Microsoft Windows, Apple macOS, Linux, Android or the like. The web page 230 is a web page that is accessible to the browser 218 of the at least one user device 208 to facilitate use of the geotagging processor software 246 as shall be described in detail with respect to FIG. 3. The data 232 may include data entered by a user into fields within a web page, geotagging data 233 and/or any other data used by the server 204 to facilitate use of the web page and geotagging the components. The database 234 contains data to facilitate determinations made by the geotagging processor software 246. This data may include, but is not limited to, at least one of identification information of the components, specifications of components, power generation or consumption data for the components, and the like. The database 234 may be locally stored at the server 204 or may be remotely stored on another server or servers and accessed via the network 206.

The server 204, when executing the geotagging processor software 246, is transformed from a general-purpose device into a specific-purpose device, i.e., transformed into a geotagging processor. The geotagging processor software 246, when executed, enables at least one user device 208 to access and interact with the web page 230, collects geotagging data (component location and identifier). The access and interaction shall be described with respect to FIG. 3. The geotagging processor software 246 may include PPP software 250, as described above, to process raw location information (e.g., GNSS data, ephemerides, angle of arrival information, etc.) to compute an accurate location of each component. The server 204 may have more processing power than the user device 208 such that it is better equipped for handling the PPP processing.

Figure 3:
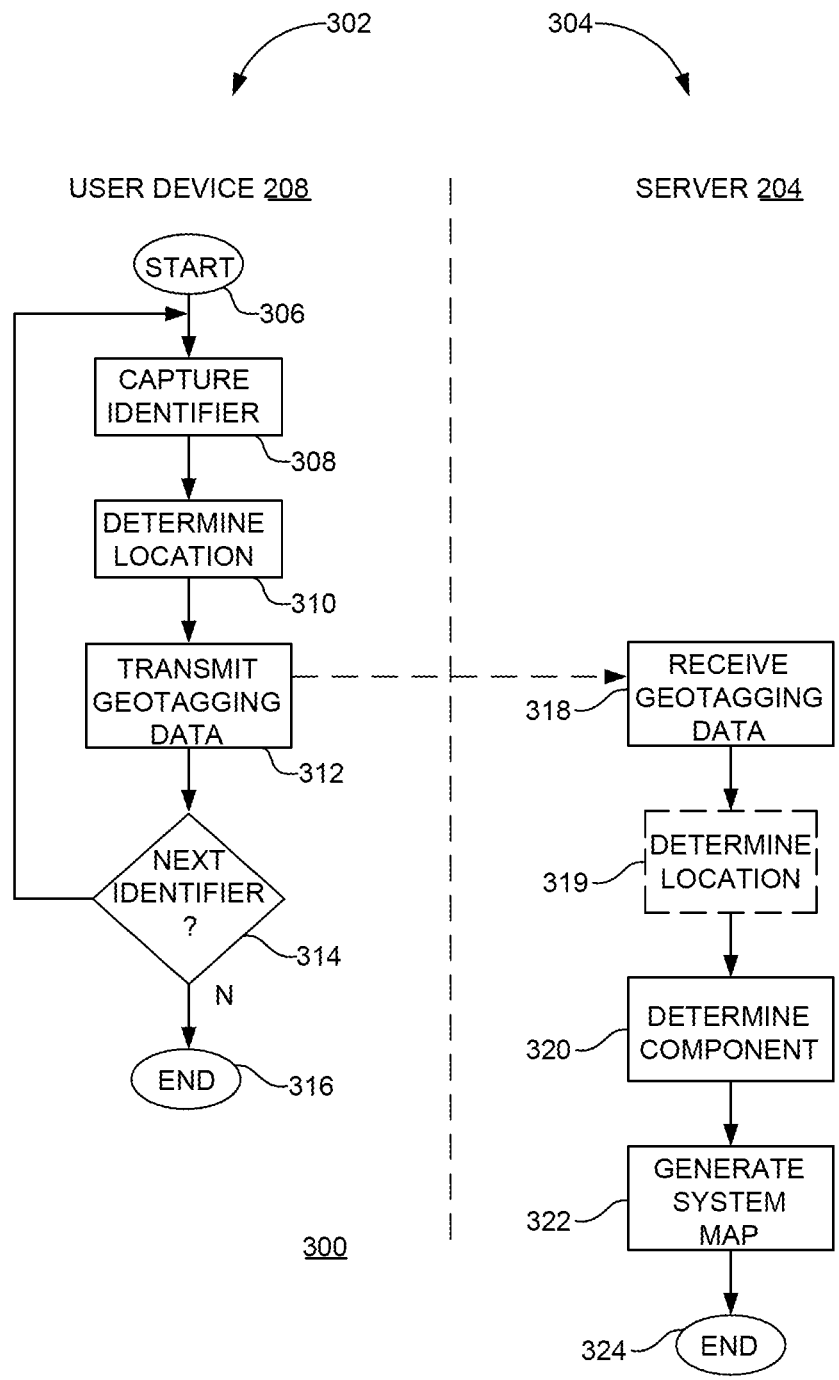
FIG. 3 depicts a flow diagram of operation of the geotagging system of FIG. 2 in accordance with an embodiment of the invention.

FIG. 3 depicts a flow diagram of operation of a geotagging system (e.g., system 200 of FIG. 2) for an energy production and consumption system (e.g., system 100 of FIG. 1) in accordance with an embodiment of the invention. As mentioned above, using the geotagging system to geotag components of a solar energy-based generation and storage system is a non-limiting example of a use for the geotagging system 200. Each block of the flow diagrams below may represent a module of code to execute and/or combinations of hardware and/or software configured to perform one or more processes described herein. Though illustrated in a particular order, the following figure is not meant to be so limiting. Any number of blocks may proceed in any order (including being omitted) and/or substantially simultaneously (i.e., within technical tolerances of processors, etc.) to perform the operations described herein.

FIG. 3 depicts a method 300 comprising steps 302 performed by the user device 208 and steps 304 performed by the server 204. In an alternative embodiment, all the steps 302 and 304 of method 300 may be performed by the user device 208. The method 300 begins at 306 and proceeds to 308 where a user, through the user device interacting with a web page or through a graphical user interface (GUI) produced by an app, captures a component identifier (i.e., scans, images, senses or otherwise captures the identifier). As described above, such a scan is performed by a sensor (e.g., camera, RFID sensor, RF transmission antenna and receiver). In one specific embodiment, a camera is used to capture an image of a serial number tag located on the component. Also, as described above, components may include, but are not limited to, one or more of the following in any combination: solar panels, microinverters, DC optimizers, inverters, cables, storage devices, batteries, appliances, or any other energy consuming device.

Generally, the browser may be used to access a web page to form a user interface for guiding the user to perform the scans of identifiers. In other embodiments, an application may be executed on the user device to guide the scanning process.

In at least one embodiment, after each scan, at 310, the user device gathers location data and determines the location at which the identifier capture occurred, i.e., the user device geotags the component associated with the identifier. The location of the user device may be continuously computed and, upon capturing an identifier, the location is logged. The location, as described above, may result from a location generator such as a GNSS receiver output, BLUETOOTH® transceiver output, or a combination of outputs having its location improved using a PPP technique. In one embodiment, the PPP technique is applied at the user device to determine a component location. In other embodiments, as described in more detail below, the location data processing may be performed in the server at 319.

At 312, the method 300 transmits the geotagging data (e.g., the component identifier and the component location) to the server via the network. In another embodiment, the raw location data may be logged, then transmitted to the server and, at 319, the PPP technique is used to process the raw data at the server to determine an accurate component location. At 314, the method 302 queries whether a next identifier is to be processed. If the query is affirmatively answered, the method 302 proceeds to 308 to capture the next identifier. If the query is negatively answered, the method 302 ends at 316.

On the server side, method 304 processes the received geotagging data to generate a holistic map of the energy production and consumption system (e.g., system 100 in FIG. 1). The server receives the geotagging data from the user device sent via the network at 318. The server may need to convert the QR code, barcode, serial number image into computer readable data, as needed. At 320, the database is accessed to determine information about the component. Generally, the component identifier is used to "look up" the component information either in a local database or via the Internet on a remote database. Such information may include the type of component and/or specifications of the component including, but not limited to, the amount of energy produced, stored or consumed by the component.

At 322, using the database information and the geotagging data, the method 300 generates a holistic map of the system 100. Generally, the map may be a graphical depiction of the energy production and consumption system such that the database information is used to depict an icon for each type of component. Selecting or hovering over the icon may display additional information about the component. The map may also form a graphical user interface (GUI) through which a user may control the components of the system. Additional detail regarding an exemplary system map is described with respect to FIG. 4.

The operational data contained in the holistic map of the system may be used for accurate system management to optimize energy production and consumption across all elements of the system. In such a system, the service panel 118 in FIG. 1 may be replaced or augmented by an energy management device that controls the flow of energy throughout the system 100. For example, such a device may control load use based upon available energy from the generators and/or the energy storage. By understanding the nature of each component that produces, stores and consumes energy, the management device is able to automatically control the system operation with accuracy and fine granularity.

At 324, the method 300 ends.

Figure 4:
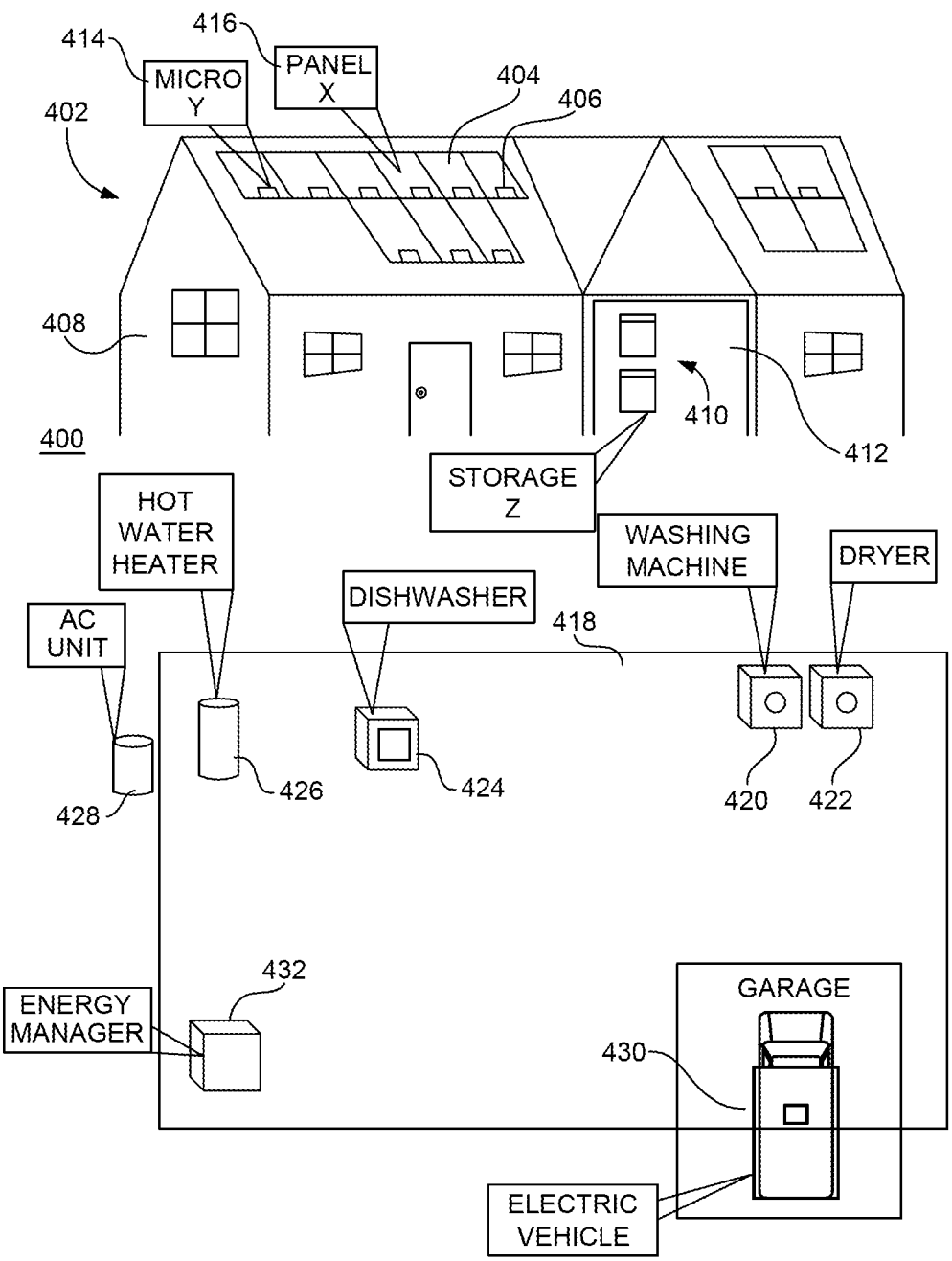
FIG. 4 depicts an example of a holistic map of the energy production and consumption system of FIG. 1 as generated by the geotagging system of FIG. 2 in accordance with an embodiment of the invention.

FIG. 4 depicts an exemplary holistic, three-dimensional, graphical map 400 that may be generated by the geotagging system 200 of FIG. 2 in accordance with at least one embodiment of the invention. The outside the home graphic 402 depicts, in three-dimensions, the precise location (using latitude, longitude, and elevation) of each component of the production and consumption system 100 of FIG. 1. The home image may be accessed from a satellite and/or street image database. In an embodiment, the various components are rendered and combined with the images to form a composite image of the house with energy production system components depicted thereupon. In one embodiment, solar panels 404 and microinverters 406 are depicted in the graphic as they are arranged in their relative locations on the roof of the user's home 408. The storage devices 410 are depicted in the garage 412. As an icon for a component is selected or hovered over, text information (text bubble) may appear on the graphic that includes specifications of the components. Text bubbles 414 and 416 specify information regarding the microinverter 406 and the solar panel 404. Further selection by, for example, double clicking, may open a new window or new page of detailed information about the component.

For components within the home, in one embodiment, they appear as icons representing each type of component. For example, using the geotagging data, the geotagging system 200 of FIG. 2, positions each load (e.g., appliance) as an icon at its location within the home. Such icons may include, but are not limited to, one or more of a washer 420, a dryer 422, a dishwasher 424, a hot water heater 426, an air conditioning (AC) unit 428, an electric vehicle charger 430 or an energy manager 432. Each icon may be selected to generate additional information (e.g., manufacturer, model number, power consumption, etc.) about the component represented by the icon. In this manner, a holistic graphical map of the entire energy production and consumption system may be displayed.

In some embodiments, the map also forms a graphical user interface to enable a user to control the system components. For example, a user may disconnect one or more consumption components when operating in "off-the-grid" mode where none of the consumed power is supplied by the utility power grid. In other embodiments, the energy manager 432 may be accessed via the map to establish an energy management protocol to control when consumption loads are powered and/or when energy storage is charged or discharged.

Of course, other layouts and formats for displaying the system may be used and form additional embodiments of the invention. In one alternative, maps could be presented in two-dimensions, with each room depicting its loads in a separate graphic. In another embodiment, a complete three-dimensional map could be produced with the walls of the house being transparent or semitransparent. The graphic may also be rotatable and/or zoomable to allow a user to view locations of components within the three-dimensional image of the home. The home may be a generic mock-up of a home or a rendered three-dimensional image of an actual home.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AB, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus for geotagging components of an energy production and consumption system comprising:
a user device comprising a sensor configured to capture an identifier of at least one component of an energy production and consumption system comprising at least one of a plurality of distributed generators, storage devices, or a service panel coupled to the at least one component and through which the distributed generator is coupled to the storage devices and a location generator configured to determine location data representing a location of the identifier where the identifier and location data form geotagging data, wherein the user device is configured to transmit the geotagging data to a network; and
a server in operable communication with the user device and configured to receive the geotagging data from the network, process the identifier to determine component information, and generate a map comprising an icon for each component positioned within the map at a location derived from the geotagging data.

2. The apparatus of claim 1 wherein the geotagging data comprises raw location data that is processed by the server to determine the location of the identifier.

3. The apparatus of claim 1 wherein the identifier is at least one of a barcode, QR code, serial number, RF transmission or RFID.

4. The apparatus of claim 1 wherein the map is a three-dimensional view of the components of the energy production and consumption system.

5. The apparatus of claim 1 wherein the map is a user interface where selecting an icon displays information regarding the component represented by the icon.

6. The apparatus of claim 1 wherein the map is a user interface enabling control of at least one component of the energy production and consumption system.

7. The apparatus of claim 1 wherein the geotagging data is processed to derive the location of the identifier using precise point positioning within the server or the user device.

8. A method for geotagging an energy production and consumption system comprising:
capturing, using a sensor of a user device, an identifier of at least one component of an energy production and consumption system comprising at least one of a plurality of distributed generators, storage devices, or a service panel coupled to the at least one component and through which the distributed generator is coupled to the storage devices;
determining, using a location generator of the user device, location data related to the identifier where the identifier and location data form geotagging data and transmitting the geotagging data to a network;
receiving at a server in operable communication with the user device the geotagging data from the network;
processing the identifier to determine component information; and
generating a map comprising an icon for each component positioned within the map at a location derived from the geotagging data.

9. The method of claim 8 wherein the geotagging data comprises raw location data and the method further comprises processing the raw location data to determine the location of the identifier.

10. The method of claim 8 wherein the identifier is at least one of a barcode, QR code, serial number, RF transmission or RFID.

11. The method of claim 8 wherein the map is a three-dimensional view of the components of the energy production and consumption system.

12. The method of claim 8 wherein the map is a user interface and the method further comprises displaying, upon selection of an icon, information regarding the component represented by the icon.

13. The method of claim 8 wherein the map is a user interface enabling control of at least one component of the energy production and consumption system.

14. The method of claim 8 further comprising processing the geotagging data to derive the location of the identifier using precise point positioning within a server or a user device.

15. The apparatus of claim 7 wherein the precise point positioning is configured to enhance position accuracy of the at least one component of the energy production and consumption system based on at least one of raw received signal data from one or more satellite frequencies, signal phase, or differential signal delay.

16. The apparatus of claim 15 wherein the position accuracy is accurate to less than 50 cm.

17. The method of claim 14 wherein the precise point positioning is configured to enhance position accuracy of the at least one component of the energy production and consumption system based on at least one of raw received signal data from one or more satellite frequencies, signal phase, or differential signal delay.

18. The method of claim 17 wherein the position accuracy is accurate to less than 50 cm.

* * * * *